No. 819,819. PATENTED MAY 8, 1906.
C. M. TAYLOR, Jr.
MEANS FOR MAKING A MILK PRODUCT.
APPLICATION FILED JUNE 28, 1905.
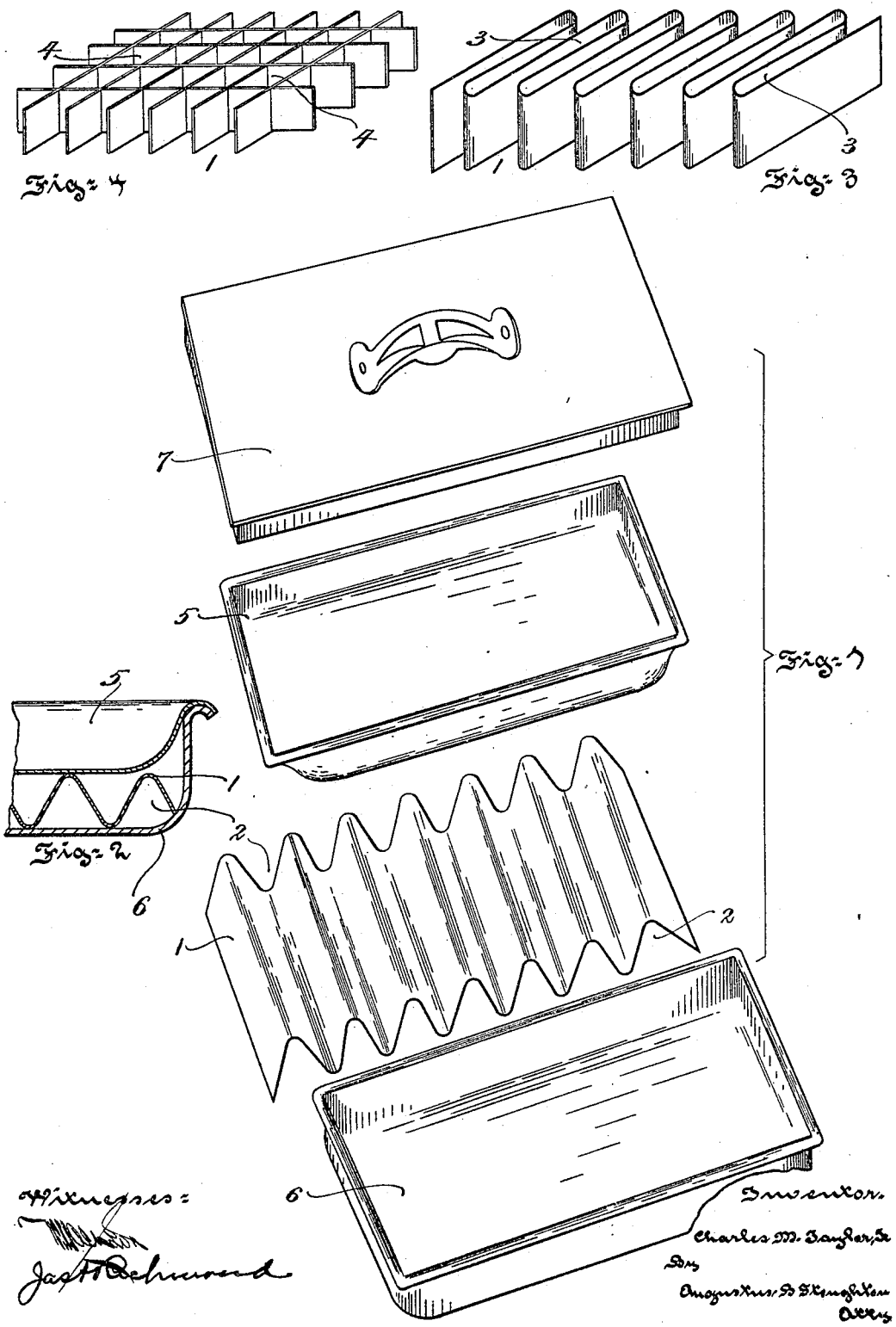

UNITED STATES PATENT OFFICE.

CHARLES M. TAYLOR, JR., OF PHILADELPHIA, PENNSYLVANIA.

MEANS FOR MAKING A MILK PRODUCT.

No. 819,819.        Specification of Letters Patent.        Patented May 8, 1906.

Application filed June 28, 1905. Serial No. 267,464.

*To all whom it may concern:*

Be it known that I, CHARLES M. TAYLOR, Jr., a citizen of the United States, and a resident of Philadelphia, in the county of Philadelphia and State of Pennsylvania, have invented certain new and useful Means for Making a Milk Product, of which the following is a specification.

It is known that the unbroken milk fatty globules or buttery constituents can be recovered without agitation or fermentation by reason of the property which may be appropriately designated "selective absorption" and which is possessed by substances such as blotting-paper, so that blotting-paper will pass the milky portions, such as skimmed milk and the like, and will retain upon its surface the product referred to.

One object of the present invention is to provide for the utilization of the property of selective absorption possessed by blotting-paper in such a way that the separation can be readily effected and the care of the apparatus reduced to a minimum, while absolute cleanliness is easily attained.

To these and other ends hereinafter set forth the invention comprises the improvements to be presently described and finally claimed.

The nature, characteristic features, and scope of the invention will be more fully understood from the following description, taken in connection with the accompanying drawings, forming part hereof, and in which—

Figure 1 is a perspective view illustrating the various parts of apparatus embodying features of the invention. Fig. 2 is a sectional view illustrating a portion of the apparatus with the parts assembled, and Figs. 3 and 4 are perspective views illustrating modifications of a portion of the apparatus.

In the drawings, 1 is an absorbent spacer having openings 2. Its form may be varied, and, as shown in Fig. 1, it consists of a sheet corrugated in horizontal direction. As shown in Fig. 3, it consists of an absorbent sheet corrugated in vertical direction and having openings 3, and, as shown in Fig. 4, it consists of intersecting absorbent plates or walls having openings 4. This spacer, as stated, is of absorbent material, preferably such as is sufficiently inexpensive to permit of its being thrown away or burned after use. An example of material well adapted for this purpose is blotting-paper.

5 is a partition impermeable to the buttery or fatty constituents and permeable to the other constituents. Blotting-paper is an example of material well adapted for constituting this partition, since it possesses the property of selective absorption, whereby the results mentioned can be obtained. In form the partition is shown as dished, so that it is adapted to receive and retain the cream or milk which is to be treated. However, its shape is not essential.

6 is a pan or receptacle, and 7 is a lid or cover for it. In use the spacer is placed in the pan—for example, in such a way that it rests upon the bottom thereof. The partition or dished receptacle 5 is placed upon and in contact with the spacer and so arranged within the pan 6. The cream or milk is poured on top of the partition or dished receptacle 5, and the lid 7 may be placed upon the pan 6, if desired, and when so placed it excludes dust. Without agitation or fermentation the non-buttery or milky portions, such as skimmed milk and the like, are absorbed by the partition 5, and the spacer 1, since it is in contact with the partition and is of absorbent material, conducts these fluids, and thus renders the absorptive properties of the partition 5 more effective.

The product which it is desired to recover and which comprises unbroken milk fatty globules or buttery constituents remains upon the partition 5 and can be recovered therefrom. Afterward the partition 5 and spacer 1, since they are comparatively inexpensive, may be burned or otherwise destroyed and fresh or new ones used for subsequently carrying on the described operation. For household use the described absorbent spacer is particularly adapted, since it hastens the performance of the operation and is so inexpensive that it may be destroyed after use, thus saving cleaning and washing operations, except so far as the pan 6 is concerned, and this, as is obvious, can be readily thoroughly cleaned and washed.

It will be obvious to those skilled in the art to which the invention appertains that modifications may be made in details without departing from the spirit thereof. Hence the invention is not limited further than the prior state of the art may require; but,

Having thus described the nature and objects of my invention, what I claim as new, and desire to secure by Letters Patent, is—

1. Apparatus of the class described comprising the combination of a partition impermeable to the buttery or fatty constituents and permeable to the other constituents, and an absorbent spacer having openings and arranged in contact with one face of the partition, substantially as described.

2. In apparatus of the class described the combination with a partition impermeable to the fatty or buttery constituents and permeable to the other constituents, of a corrugated absorbent sheet arranged in contact with one face of the partition, substantially as described.

3. Apparatus of the class described comprising a pan, an absorbent spacer having openings and arranged upon the bottom of the pan, and a partition arranged above and in contact with the spacer and impermeable to the fatty or buttery constituents and permeable to the other constituents, substantially as described.

4. In apparatus of the class described the combination of a dished partition impermeable to the fatty or buttery constituents and permeable to the other constituents, and an absorbent spacer having openings and arranged in contact with the bottom face of the dished partition, substantially as described.

In testimony whereof I have hereunto signed my name.

CHARLES M. TAYLOR, Jr.

Witnesses:
W. J. JACKSON,
A. B. STOUGHTON.